Feb. 25, 1930. W. R. PETERSON 1,748,392
TRACTOR HARROW
Filed Aug. 27, 1927 2 Sheets-Sheet 2
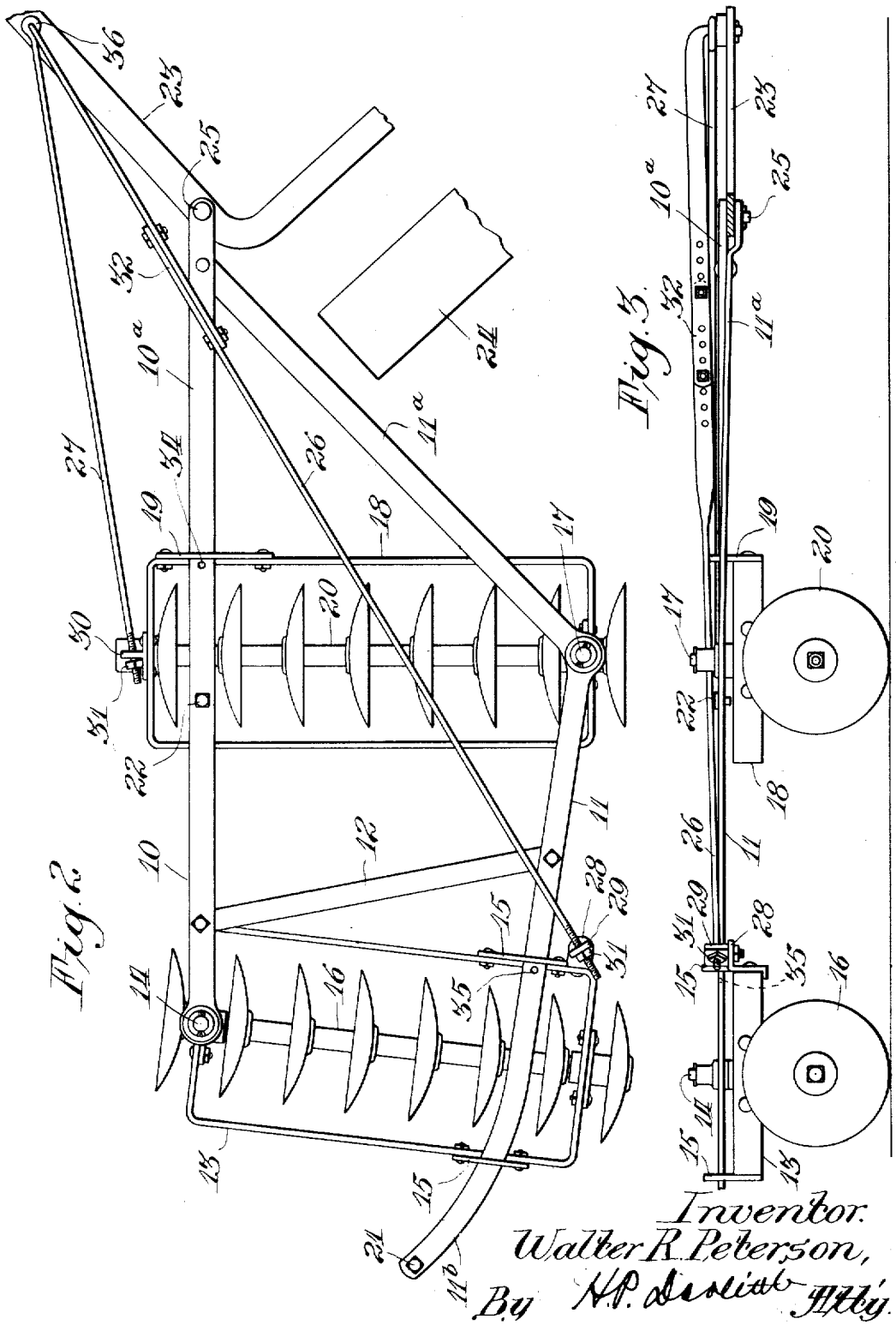
Inventor
Walter R. Peterson,
By H.P. Sinclair Atty.

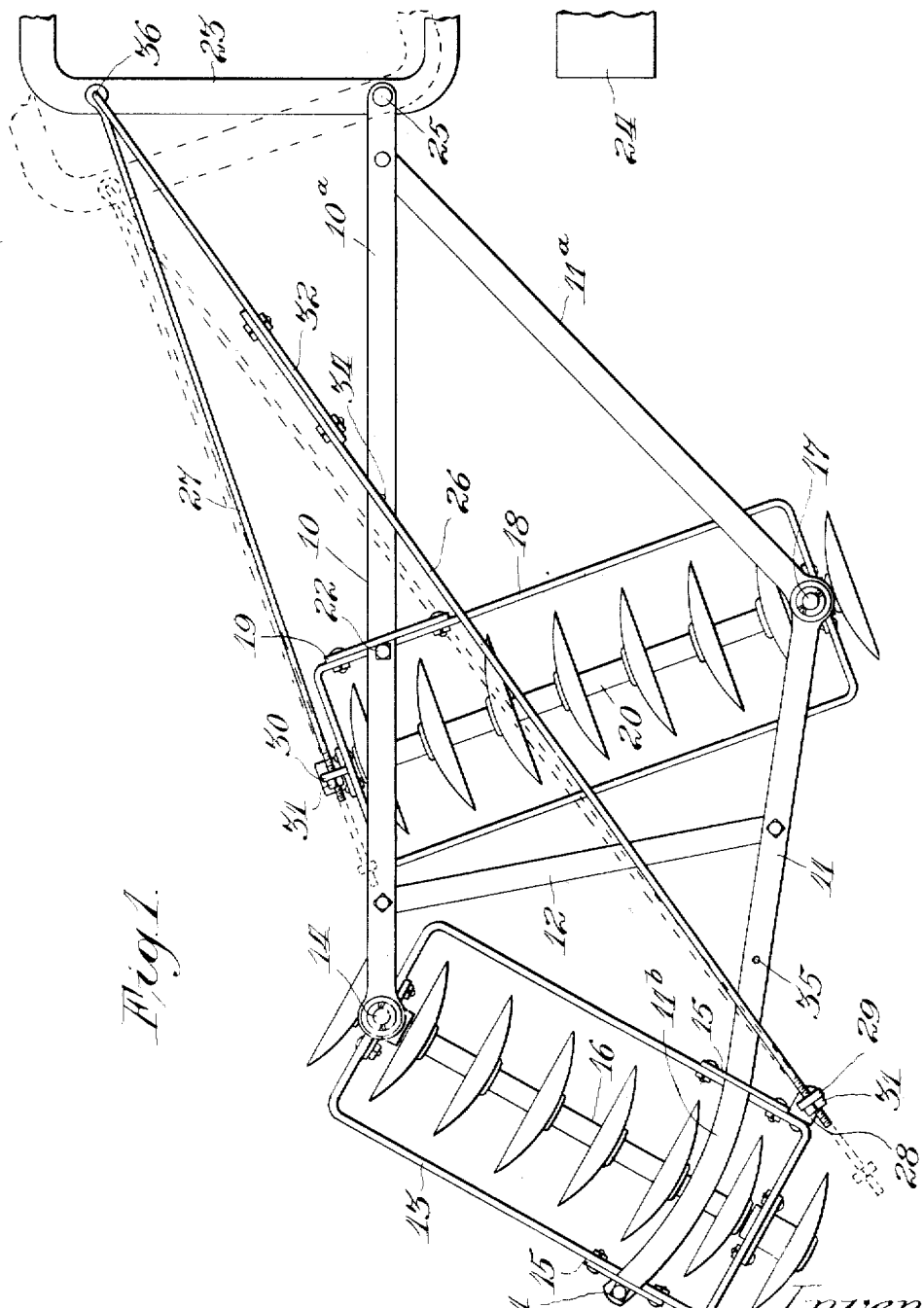

Patented Feb. 25, 1930

1,748,392

UNITED STATES PATENT OFFICE

WALTER R. PETERSON, OF PARK RIDGE, ILLINOIS, ASSIGNOR TO INTERNATIONAL HARVESTER COMPANY, A CORPORATION OF NEW JERSEY

TRACTOR HARROW

Application filed August 27, 1927. Serial No. 215,834.

This invention relates to tillage implements and particularly to implements designed for use with tractors. Broadly, the object of the invention is to positively angle a tillage implement through change in direction of travel of the tractor. The particular purpose of the invention is to provide a tractor disk harrow of the two gang, tandem type embodying means for controlling the angle of the gangs through turning movement of the tractor and including means for automatically bringing the gangs into substantial parallelism when turning the tractor and harrow in the direction toward which the divergent ends of the gangs are presented, thus presenting a structure which permits turns to either the right or left with equal facility.

Another object of the invention is to provide a simple, rigid, frame structure carrying two pivoted disk gangs in tandem relation, so constructed as to trail in offset relation to the tractor, and having novel and simple means of control during operation.

These and other minor objects and advantages are attained through employment of the novel organization and details of construction more particularly described in the following specification and illustrated in the accompanying drawings, on which—

Figure 1 is a plan view of a disk harrow embodying the invention and shown hitched in operating position to a tractor drawbar;

Figure 2 is a similar view, but with the gangs and certain other parts shown in the positions assumed during a turn; and Figure 3 is a side view of the harrow as seen in Figure 2.

As illustrating one structural embodiment of the invention, there has been shown a main harrow frame composed of lateral bars 10 and 11, rigidly connected at intermediate points by suitable crossbars or braces, such as 12. The bar 10 is preferably extended forwardly, as at 10ª, and its forward end is connected to bar 11 through an angular extension 11ª of that bar, the two extensions together thus forming the draft portion of the frame with the hitch end offset at what is normally the inner side of the harrow.

The rear end of bar 10 has a rear gang frame 13 pivoted to it on a vertical pivot 14. The frame 13 extends across to and is slidably engaged with the rear portion of bar 11 which is preferably curved, as at 11ᵇ, on an arc about pivot 14, to facilitate movement of the frame 13. The frame 13 lies below the frame bars 10—11 and the bar 11 is preferably received in upright guide yokes 15 on the front and rear members of the gang frame. The gang frame 13 carries a disk gang 16 of standard type journaled in suitable depending bearing brackets on the frame ends. The disks of this gang ordinarily have the concave sides thereof presented inwardly or towards the line of draft. At a forward point on bar 11, preferably at the junction of the angular extension 11ª therewith, there is pivoted at 17 a second forward gang frame 18, which is substantially a duplicate of frame 13. This gang frame slidably engages bar 10, which is received in a guide yoke 19 on the forward member of the gang frame. A disk gang 20 is journaled in the frame with its disks faced oppositely to those of the rear gang 16. At 21 on the end of bar 11 and at 22 on bar 10, stops are provided which limit the movements of the gang frames by contact with the frames as illustrated in Figure 1. The structure so far described provides a rigid frame having front and rear disk gangs arranged in tandem relation and respectively pivoted to opposite sides of the frame. The means for effecting and controlling angular movements of the gangs on the pivots will next be described.

On Figures 1 and 2, at 23, there is represented the drawbar of a tractor, which bar is preferably mounted midway between the traction wheels, one of which is shown in part at 24. The drawbar may be of the wide U-shape shown, or of other form, but should be such as to afford two transversely spaced points for pivotal connection of the harrow to the tractor. When, as in the present instance, the harrow is intended for operation in laterally offset relation to the tractor, as in orchard work, the main or draft connection is located at one side of the median line of the tractor. Therefore, the forward end 10ᵃ of bar 10 is shown as pivotally coupled at 25 to one end of the straight transverse portion of drawbar 21. The gang angle control is obtained through means which communicate angular or turning movements of the tractor and of drawbar 23 to the gang frames 13 and 18, and said means preferably consist of rigid rods or bars 26 and 27 concentrically pivoted at their forward ends to the drawbar 23 at a point 36 on the opposite end of the drawbar from the draft connection 25 and connected at their rear ends to the free ends of the respective gang frames. The forward point of connection is, therefore, offset laterally and inwardly from the harrow. Rod 26 is connected to rear gang frame 13 through a horizontal lug 28 carrying a swiveled eye 29, in which the end of rod 26 is received, and bar 27 is similarly connected to frame 18 by an apertured lug 30 on the free end of the gang frame, which lug receives the end of rod 27. These ends of rods 26 and 27 are preferably screw-threaded to carry nuts 31 acting as adjustable stops limiting forward sliding movement of the rods. In addition, the rods may be made adjustable as to length, as by making them in overlapped adjustably connected sections, as shown at 32 on rod 26. For locking the gangs in parallel relation, as for transport, there are provided means, such as openings 34 and 35, in the respective frame bars into which stop pins may be placed after the gangs are brought to the positions shown in Figure 2.

In operation the gangs will be disposed in substantially the angled relation shown in Figure 1 and will be maintained in angled relation by the thrust of the soil engaged by the disks. When a turn is to be made to the right, the tractor and drawbar will assume the position of Figure 2, in effect pivoting at 25, and moving the hitch point 36 of the angling rods forwardly, thus transmitting a pull to the free ends of the respective gang frames, which serves to bring them into substantially parallel relation. This permits the right turn to be made easily and without dragging the gangs through the soil in the direction of their lengths. Upon return to straight forward travel, the gangs will automatically resume the original working angle. On a left turn, straightening up of the gangs is obviously not necessary, as the angled gangs are in proper position to follow a curved path toward the left. The effect of such a turn by the tractor will be merely to cause the rods 26, 27 to slide back through the eyes 29, 30, as shown in dotted lines on Figure 1, the gang frames being held against further movement by the stops 21, 22.

It will accordingly be clear that a simple orchard disk harrow of the two gang type has been contrived, which permits turns to be made to either the right or left without in either case necessitating previous straightening of the gangs, and one in which the straightening up of the gangs is automatically effected by turning the tractor towards one side.

The invention, therefore, may be embodied in different structures within the scope of the following claims.

What is claimed is:

1. In a tractor harrow, the combination of a frame, a pair of disk gangs disposed in tandem relation and connected at opposite ends to the frame by vertical pivots, each gang normally extending angularly rearward from its pivot, a horizontally extended tractor drawbar, a draft connection between the frame and drawbar, and connecting means between the rearwardly extending end of each gang and the drawbar effective upon horizontal angular movement of the drawbar to move the disk gangs on said pivots to the frame.

2. In a tractor harrow, the combination of a frame, a pair of normally angularly related disk gangs disposed in tandem relation and each pivoted on a vertical axis at one end of the gang to said frame with the pivots of the respective gangs at opposite sides of the frame, a horizontally extended tractor drawbar, a draft connection between the frame and one point on the drawbar, and direct connections between another point on the drawbar and the free end of each gang effective upon horizontal angular movement of the drawbar in one direction to move the disk gangs into substantially parallel relation.

3. In a tractor harrow, the combination of a frame, a pair of normally angularly related disk gangs disposed in tandem relation and each pivoted on a vertical axis at one end of the gang to said frame with the pivots of the respective gangs at opposite sides of the frame, a horizontally extended tractor drawbar, a draft connection between the frame and one point on the drawbar, and a pair of rods concentrically pivoted on a vertical axis at another point on the drawbar and connected to the free ends of the respective gangs, whereby horizontal angular movement of the drawbar in one direction will tend to swing the gangs into parallel relation.

4. In a tractor harrow, the combination of a frame, a pair of normally angularly related disk gangs disposed in tandem relation and each pivoted on a vertical axis at one end of the gang to said frame with the pivots of the respective gangs at opposite sides of the frame, a horizontally extended tractor drawbar, a draft connection between the frame and one point on the drawbar, a pair of rods concentrically pivoted on a vertical axis at another point on the drawbar, a lug on the free end of each gang having an opening in which the ends of the respective rods are freely movable, and a stop on the end of each rod normally in engagement with said lugs.

5. In a tractor disk harrow, the combination with a tractor drawbar of a pair of implement frames disposed in tandem relation, a series of tillage disks on each frame, means connecting the frames for relative horizontal angular movement comprising a frame structure hitched to the drawbar on a vertical pivot, and means for changing the angular relation between the implement frames upon change in the direction of travel of the tractor comprising direction independent connecting means between a point on each of the implement frames and the drawbar, said connecting means having a point of connection to the drawbar spaced laterally from the hitch point of the frame structure.

6. In a tractor disk harrow, the combination of a horizontally disposed tractor drawbar, a frame structure pivotally hitched to the drawbar on a vertical axis, a pair of disk gangs disposed in tandem relation on said frame and connected for relative horizontal angular adjustment, and means connected to the drawbar and actuated by angular movement thereof in a horizontal plane for altering the relative angular adjustment of the disk gangs, comprising a link pivoted to the drawbar at a point laterally spaced from the pivot of the frame structure and pivoted to one of said disk gangs.

7. A tractor harrow comprising a pair of implement frames disposed in tandem relation, means for connecting the frames to a drawbar, said means permitting relative angular movement horizontally of the frames, and means for controlling the angular relations of the implement frames by draft power comprising direct draft connections adapted for coupling to the drawbar, said draft connections having one portion thereof pivoted to the forward frame at one side of the longitudinal median line of the harrow and another portion pivoted to the rear frame at the other side of said line.

In testimony whereof I affix my signature
WALTER R. PETERSON.

CERTIFICATE OF CORRECTION.

Patent No. 1,748,392.    Granted February 25, 1930, to

WALTER R. PETERSON.

It is hereby certified that error appears in the printed specification of the above numbered patent requiring correction as follows: Page 3, line 14, claim 5, for the word "direction" read "direct"; and that the said Letters Patent should be read with this correction therein that the same may conform to the record of the case in the Patent Office.

Signed and sealed this 8th day of April, A. D. 1930.

M. J. Moore,
Acting Commissioner of Patents.

which the ends of the respective rods are freely movable, and a stop on the end of each rod normally in engagement with said lugs.

5. In a tractor disk harrow, the combination with a tractor drawbar of a pair of implement frames disposed in tandem relation, a series of tillage disks on each frame, means connecting the frames for relative horizontal angular movement comprising a frame structure hitched to the drawbar on a vertical pivot, and means for changing the angular relation between the implement frames upon change in the direction of travel of the tractor comprising direction independent connecting means between a point on each of the implement frames and the drawbar, said connecting means having a point of connection to the drawbar spaced laterally from the hitch point of the frame structure.

6. In a tractor disk harrow, the combination of a horizontally disposed tractor drawbar, a frame structure pivotally hitched to the drawbar on a vertical axis, a pair of disk gangs disposed in tandem relation on said frame and connected for relative horizontal angular adjustment, and means connected to the drawbar and actuated by angular movement thereof in a horizontal plane for altering the relative angular adjustment of the disk gangs, comprising a link pivoted to the drawbar at a point laterally spaced from the pivot of the frame structure and pivoted to one of said disk gangs.

7. A tractor harrow comprising a pair of implement frames disposed in tandem relation, means for connecting the frames to a drawbar, said means permitting relative angular movement horizontally of the frames, and means for controlling the angular relations of the implement frames by draft power comprising direct draft connections adapted for coupling to the drawbar, said draft connections having one portion thereof pivoted to the forward frame at one side of the longitudinal median line of the harrow and another portion pivoted to the rear frame at the other side of said line.

In testimony whereof I affix my signature

WALTER R. PETERSON.

CERTIFICATE OF CORRECTION.

Patent No. 1,748,392.　　　　　　　　　　　　Granted February 25, 1930, to

WALTER R. PETERSON.

It is hereby certified that error appears in the printed specification of the above numbered patent requiring correction as follows: Page 3, line 14, claim 5, for the word "direction" read "direct"; and that the said Letters Patent should be read with this correction therein that the same may conform to the record of the case in the Patent Office.

Signed and sealed this 8th day of April, A. D. 1930.

M. J. Moore,
Acting Commissioner of Patents.